United States Patent Office 3,180,591
Patented Apr. 27, 1965

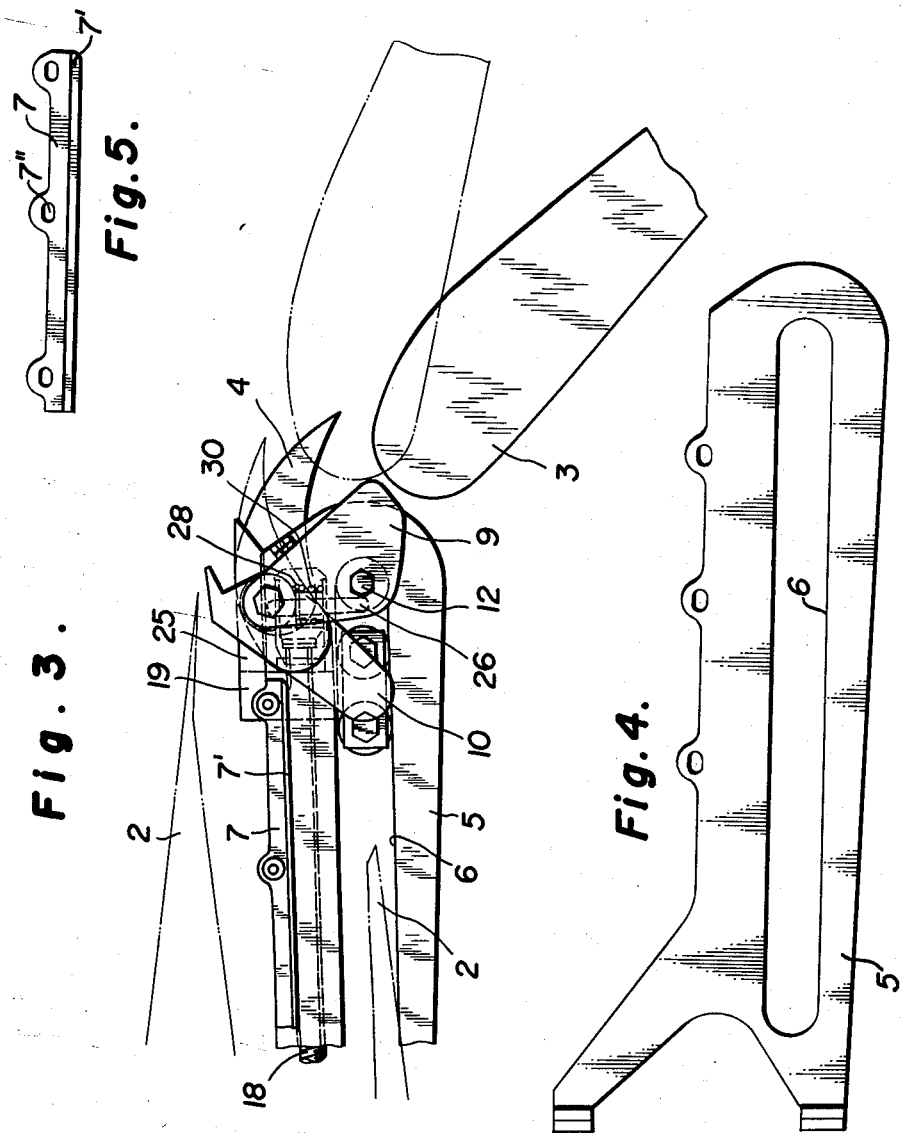

3,180,591
FLAP DEVICE
Akira Ikeda, Daiman-cho, Chikusa-ku, Nagoya, and Terumitsu Okabe, Midori-ku, Nagoya, Japan, assignors to Shin-Mitsubishi Jukogyo Kabushiki Kaisha, Tokyo, Japan
Filed May 20, 1963, Ser. No. 281,641
Claims priority, application Japan, May 21, 1962, 37/20,761
11 Claims. (Cl. 244—42)

This invention relates to a flap device, and more particularly, to a device for moving a flap relative to a wing along a prescribed path.

Conventionally, various constructions have been provided for moving a flap. However, in those of simple construction, the flap motion is so elemental that proper flap angles conforming to flight conditions are not obtainable. On the other hand, in the devices designed to obtain flap angles precisely conforming to flight conditions, the mechanism is so delicate and complicated that defects such as unsteadiness, jamming and general unreliability are experienced.

Therefore, an object of this invention is to provide a device for moving a flap which is simply constructed yet affords satisfactory flap operation in conformity to flight conditions. Another object of the invention is to cause the flap to be first linearly displaced and then rotated to the desired flap angle. Yet another object of the invention is to obtain the desired flap motion by means of a pair of pivotally connected links which are controlled in simple manner.

In accordance with the objects of the invention there is contemplated a flap moving device comprising a first link secured with the flap, a second link having one end pivotally connected with the first link and the other end with an actuating member, a rail member having a guiding channel guiding both links, means restricting rotary movement of the links and releasing the restriction at the end of the guiding channel, and stop means for preventing movement of the first link with the latter at the end of the guiding channel.

It is a feature of the invention to provide rollers rotatably secured at the remote ends of both links and supported for travel in the guide channel of a rail.

According to a further feature of the invention the flap is moved rearwardly from the trailing edge of the main wing structure while retaining substantially the same flap angle to a final rearward position after which the flap angle may be varied while the flap is still held in said rearward position.

Other objects, features, and advantages of the invention will become apparent from the following description taken in connection with the accompanying drawings in which:

FIG. 3 is a side view illustrating the flap device in a deflected position;

FIG. 4 is a side view of a rail member of the flap device; and

FIG. 5 is a side view of a guide member of the flap device.

Figure 1:
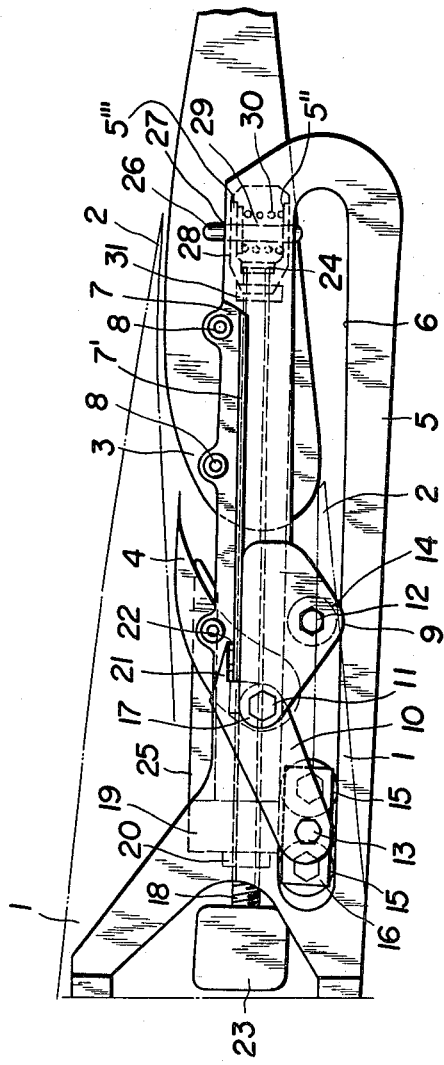
FIG. 1 is a side view of a flap device showing an embodiment according to the present invention.
Figure 2:
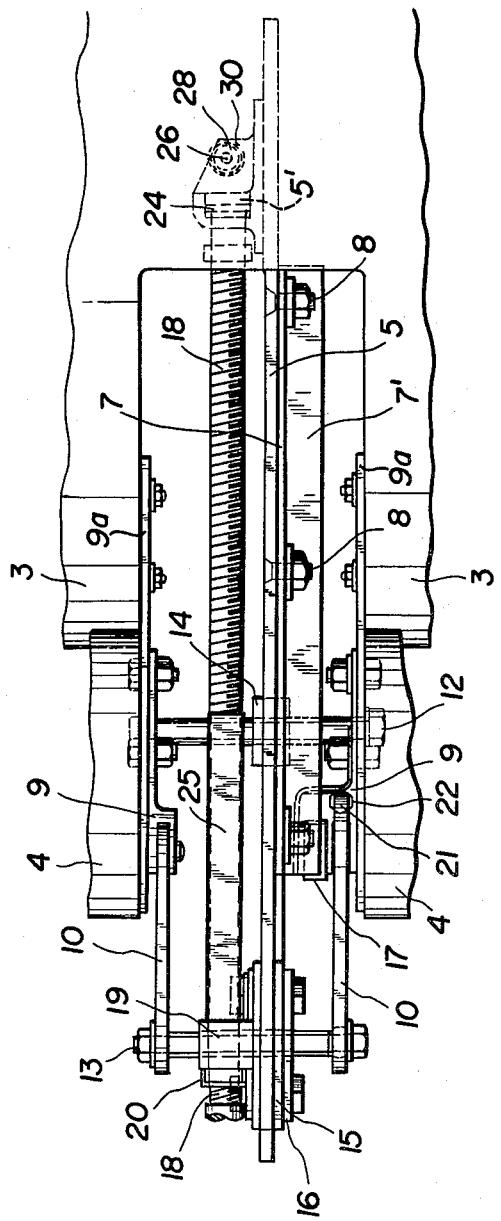
FIG. 2 is a plan view of the same.

In FIG. 1, 1 represents the trailing edge portion of the main wing structure, 2 shows the lips of the trailing edges of the trailing edge portion, the flap device of the present invention being accommodated in the trailing edge 1 of the main wing structure.

3 is a main flap and 4 is a forward or fore flap. 5 is a rail member secured to the trailing edge 1 of the main wing structure and, as described later, is provided with a sliding channel 6 to guide both a first link secured with the flap and a second link. The rail extends generally fore and aft along a wing chord line. On the rail member 5 is supported guide means 7 which is secured by screws 8 for restraining the junction of the first and second links so as to prevent rotating movement of the links as will be explained in greater detail hereinafter. The opening 7" for the screw 8 on the guide means 7 is elongated so that the guide means 7 may be adjustably positioned fore and aft on the rail member 5.

9 represents the first link securing the main flap 3 and the fore flap 4 to each other. Link 9 is connected to flap 3 by the member 9a. 10 is the second link, one end of which is connected with the first link by an eccentric bolt 11 and the other end with an actuating member as explained hereinafter.

The links 9 and 10 respectively are positioned on both sides of the rail member 5 so that the latter is placed between pairs of links. The first link 9 and the second link 10 on both sides are respectively connected by pins 12 and 13, and on the pin 12 is provided a roller 14 which is guided for rolling movement in the sliding channel 6 of the rail member 5. On the pin 13 is provided means 16 on which two rollers are rotatably supported for rolling movement in the sliding channel 6. To the eccentric bolt 11 connecting the first link 9 and the second link 10 with each other, is connected a follower 17 for preventing rotary movement of the links 9 and 10 during the engagement of follower 17 with the lower surface of the flange 7' of the guide means 7.

18 is a screw rod, one end of which is accommodated in a bearing 23 and the other end in a bearing 24 carried in a bearing box (5') on the rail member 5. The rod 18 is driven in rotation by suitable driving means (not shown). On said screw rod 18 is supported a screw nut 19, which is moved axially on the screw rod 18 as the latter rotates.

The screw nut 19 is connected with the pin 13 connecting the links 10 and transmits displacement of the nut 19 to the links 10 via the pin 13. 20 is a stop for limiting forward displacement of the screw nut 19.

At the end portion of the second link 10 where the first link 9 is connected therewith, there is provided a projection 21. The head of an adjusting screw 22 which is fitted on the upper face of the first link 9 supports projection 21. By turning the adjusting screw 22 to adjust the height thereof, the second link 10 is lowered or lifted, and the eccentric bolt 11 fixed to both links is lowered or lifted therewith. This permits the follower 17 fitted on the eccentric bolt 11 which connects the first link 9 with the second link 10 to be adjusted so as to engage the guide means 7.

25 is a stop actuating member provided on the screw nut 19. 26 is a stop member inserted in a slot 27 provided on the bearing box (5') at the rearward end of the rail member 5, and a flange 28 is provided on said stop member 26. Stop member 26 and flange 28 penetrate into a space 29 provided in a bearing box (5') of the rail member 5. Between the bottom face 5" of the rail member bounding the space 29 and the flange (28) provided on the stop member 26 is a spring 30 continuously urging the stop member 26 upwardly so that the flange 28 abuts the upper surface 5''' of the rail member bounding the space 29. The tapered leading edge of the actuating member 25 contacts the stop member 26 during travel of the nut 19 rearwardly. This causes the stop member to be depressed and projected into the sliding channel (6), the actuating member then passes over the depressed stop member 26. The stop actuating member 25 and the stop member 26 constitute stop means for restraining movement of the first link 9 when the latter has reached the rearward end of the sliding channel 6 under the action of the actuating member. Thus, when the links 9 and 10 are moved toward the rearward end of the rail member 5 by means of rod 18 and nut 19 and the roller 14 on the first link reaches the rearward end of the sliding channel 6, the stop actuating member 25 abuts the stop member 26 projecting from the upper surface of the rail member 5 so as to urge the stop member 26 downwardly into the channel 6 against the action of spring 30, the stop member thereby retaining the roller 14 at the end of the sliding channel 6. At this time, the follower 17, fitted on the eccentric bolt 11 connecting the first link 9 with the second link 10 is disengaged from the lower surface of the flange (7') of the guide means 7. The second link 10 is continued to be urged rearwardly in the sliding channel 6 turning counter-clockwise around the pin 13. On the other hand, the first link 9 is constructed so that the roller 14 is turned clockwise around the pin 12 while the roller is held at the end of the sliding channel 6 by the stop member 26.

In the present flap device, if the screw-nut 19 is urged to the right from the position as shown in FIG. 1 by rotatingly driving the screw rod 18 by a driving means (not shown), the second link 10, connected with the screw nut 19 by means of the pin 13, moves in a fixed attitude along the sliding channel 6, in which the roller 15 is engaged. The first link 9 and the second link 10 connected with each other by the eccentric bolt 11 are moved to the right along the sliding channel 6 in the position as shown in FIG. 1 all during the travel. This is insured as long as the follower 17 fitted on the eccentric bolt 11 is engaged with the guide means 7, restraining respective rotary movement of the links 9 and 10. When the roller 14, which is fitted on the pin 12 conecting the links 9 on both sides of the rail member 5 with each other reaches the rearward end of the sliding channel 6, the stop actuating member 25 abuts the stop member 26 urging the latter downwardly against the pressure of the spring 30. The stop member 26 then projects into the sliding channel 6 and holds the roller 14 at the rearward end of the sliding channel 6 and prevents further movement of the roller 14 in the sliding channel 6. At this time, as the follower 17 is disengaged from the lower surface of the flange (7') of the guide means 7, the links 9 and 10 are free to rotate, and when the second link 10 is moved farther to the right by the actuating member, the second link 10 is turned counter-clockwise around the pin 13, and in accordance therewith, the first link 9 which is connected with the second link 10 turns clockwise around the pin 12, which in turn varies the flap angle of the flaps 3 and 4 secured to the link 9 as shown in FIG. 3. In effect, therefore, the flaps 3 and 4 move rearwardly in a fixed angular position until the roller 14 contacts the pin 26, whereafter further actuation by screw nut 19 causes rotation of the flaps 3 and 4 about a fixed axis passing through bolt 12. Further, movement of the screw nut 19 to the right is restricted by the stop 31.

To return the deflected flaps 3 and 4 to their original positions, the screw rod 18 is rotated in a direction reverse to that for deflecting the flaps, and the screw nut 19 moves to the left in FIG. 3. The links 10 turn clockwise, around the pin 13 which moves to the left and links 9 turn counter-clockwise around the pin 12. When the screw nut 19 is moved to the position where the stop actuating member 25 is disengaged from the stop member 26, the follower becomes engaged with the guide means 7, and the links 9 and 10 are restrained from further rotary movement and held in fixed attitude. As the stop member 26 is released by the stop actuating member 25 the spring 30 returns the stop member 26 to the position as shown in FIG. 1. The links 9 and 10 are moved to the left along the sliding channel 6 maintaining the position as shown in FIG. 1. The flaps 3 and 4 which are secured to the link 9 are moved to the left together with the link 9.

Summarizing: the rail guides the first link which is secured with the flap and the second link which is connected with the first link while means restricts the pivotal movement of the links to prevent relative rotary movement and releases the restriction at the outward end of the sliding channel in the rail at which time the flap angle is varied to a desired value by rotation of the first link about a fixed axis when its one end reaches the outward end of the sliding channel. Accordingly, the present flap device has a very simple construction and no excessive stress is experienced. Moreover, as the present flap device is of very simple construction as abovementioned, only a narrow space is required for accommodating the flap device and the portion thereof projecting from the contour of the wing is very small.

The flap device of the invention has advantages, in that as the second link is further moved by the actuating member when the first link reaches the outward end of the sliding channel and is stopped thereat, the first link pivots around the restricted point to vary the flap angle to a desired value, and when the flap angle is zero, the flap effectively acts on the dynamic lift ratio of the flap.

The guide channel in the flap has been shown as being parallel to the wing chord plane but it is apparent that the guide channel could be inclined with respect thereto whereby for example the flap may be lowered as the links move rearwardly in the guide channel without rotating. It will be clear that the flap angle in the latter situation will be constant.

It will be obvious to those skilled in the art that the invention is not limited to the specific construction disclosed, but covers all modification and variations without departing from the spirit of the invention as defined in the following claims.

What is claimed is:

1. A mechanism for moving the flap of a wing, said mechanism comprising: a first link secured to said flap, a second link having one end pivotally connected to the first link and an opposite remote end, drive means engaging the second link at said opposite remote end, a rail provided with a guide channel, roller means on each of said links supported in said guide channel in said rail, guide means cooperating with the pivotal connection of the links to prevent angular movement of the links as the latter are displaced by the drive means, and stop means limiting movement of the roller means of the first link in the guide channel, said guide means being foreshortened to release the links for free pivotal movement as the movement of said first link is limited by said stop means, said links undergoing pivotal movement as the first link is limited by the stop means and the second link is continued to be moved by the drive means, the flap undergoing angular movement as the first link is pivotally moved.

2. A mechanism for moving the flap of a wing, said mechanism comprising: a fixedly supported rail extending generally fore and aft at the rear portion of the wing, said rail being provided with an opening constituting a guide channel, first and second links pivotally connected together each having remote free ends, roller means connected to each of the links at the free ends and rollably supported in the guide channel in the rail, a roller rotatably supported at the pivotal connection between the links, driving means engaging one of the links at the remote end thereof for moving the latter end while moving the roller means connected thereto in the guide channel in the rail, a flange supported on the rail, the roller being in contact with the flange and causing said links to move together in fixed attitude as the driving means moves said one link, a stop supported in the guide channel adjacent an end thereof for contacting the roller means of the other of the links for limiting movement thereof in said channel, said flap being secured to said other link, said roller being free of said flange with the roller means of said other link in contact with said stop, said links undergoing angular movement and thereby causing angular movement of the flap as said roller means of said other link is in contact with said stop and the roller means of said one link is continued to be moved in said guide channel by the driving means.

3. A mechanism as claimed in claim 2 comprising a second stop for limiting the travel of the roller means on said one link.

4. A mechanism as claimed in claim 2 comprising a fore flap secured to the said other link, said fore flap moving angularly along with said other link as the latter undergoes angular movement.

5. A mechanism as claimed in claim 2 comprising spring means elastically urging said stop out of the guide channel and a stop actuating member associated with the driving means for urging the stop against the action of the spring means into the guide channel before the roller means associated with said other link has reached said stop.

6. A flap moving mechanism comprising a fixedly supported rail extending generally fore and aft, said rail being provided with a fore and aft extending opening constituting a guide channel, first and second links extending approximately parallel to said rail and spaced therefrom, the flap being supported from a first of said links for concurrent movement therewith, a bolt pivotally connecting said links together, said links having ends remote from said bolt, a roller connected to each of the remote ends of the links and respectively supported only for movement in the guide channel of the rail, a follower supported by said bolt, a flange on said rail, said follower being in contact with said flange and thereby preventing relative angular movement of the links about said bolt, driving means associated with one of the rollers for moving the same along the guide channel and the links therewith in fixed attitude, stop means for being positioned within said guide channel for limiting the movement of the other of the rollers in the guide channel, said flange being foreshortened with respect to said stop means to free the follower as said other roller is limited by the stop means whereby relative angular movement of the links is obtained as said one roller is continued to be moved in the guide channel under the action of the driving means, said flap undergoing linear displacement as said first link is moved in fixed attitude and then undergoing rotation as said first link is angularly moved.

7. A flap moving mechanism as claimed in claim 6 comprising means for initially adjusting the position of the links and of the bolt connecting the same to adjust the position of the follower with respect to the flange.

8. A flap moving mechanism as claimed in claim 6 wherein said driving means comprises a threaded rod extending parallel to the rail, and an axially movable nut on said rod, and means connecting said nut to said one roller to move the same in said guide channel.

9. A flap moving mechanism as claimed in claim 6 comprising a second pair of links extending on a side of the rail opposite that of the first links, pins connecting said links of each pair respectively with corresponding links of the other pair to cause both pair of links to undergo common movement.

10. A flap moving mechanism as claimed in claim 9 wherein said flap is connected to corresponding first of said links of each pair of links.

11. A flap moving mechanism as claimed in claim 9 comprising a fore flap located forwardly of the first said flap and also secured to the first of said links of each pair of links for concurrent movement therewith.

References Cited by the Examiner

UNITED STATES PATENTS

| | | | |
|---|---|---|---|
| 2,115,225 | 4/38 | Zaparka | 244—42 |
| 2,137,879 | 11/38 | Ksoll | 244—42 |
| 2,826,379 | 3/58 | Alberti et al. | 244—42 |
| 2,836,380 | 5/58 | Pearson | 244—42 |

FOREIGN PATENTS 729,633   1/43   Germany.

OTHER REFERENCES

Ser. No. 245,580, Ksoll (A.P.C.), published May 25, 1943.

MILTON BUCHLER, *Primary Examiner.*